H. B. HURD.
Carriage-Tongue Support.
No. 77,382.
Patented April 28, 1868.
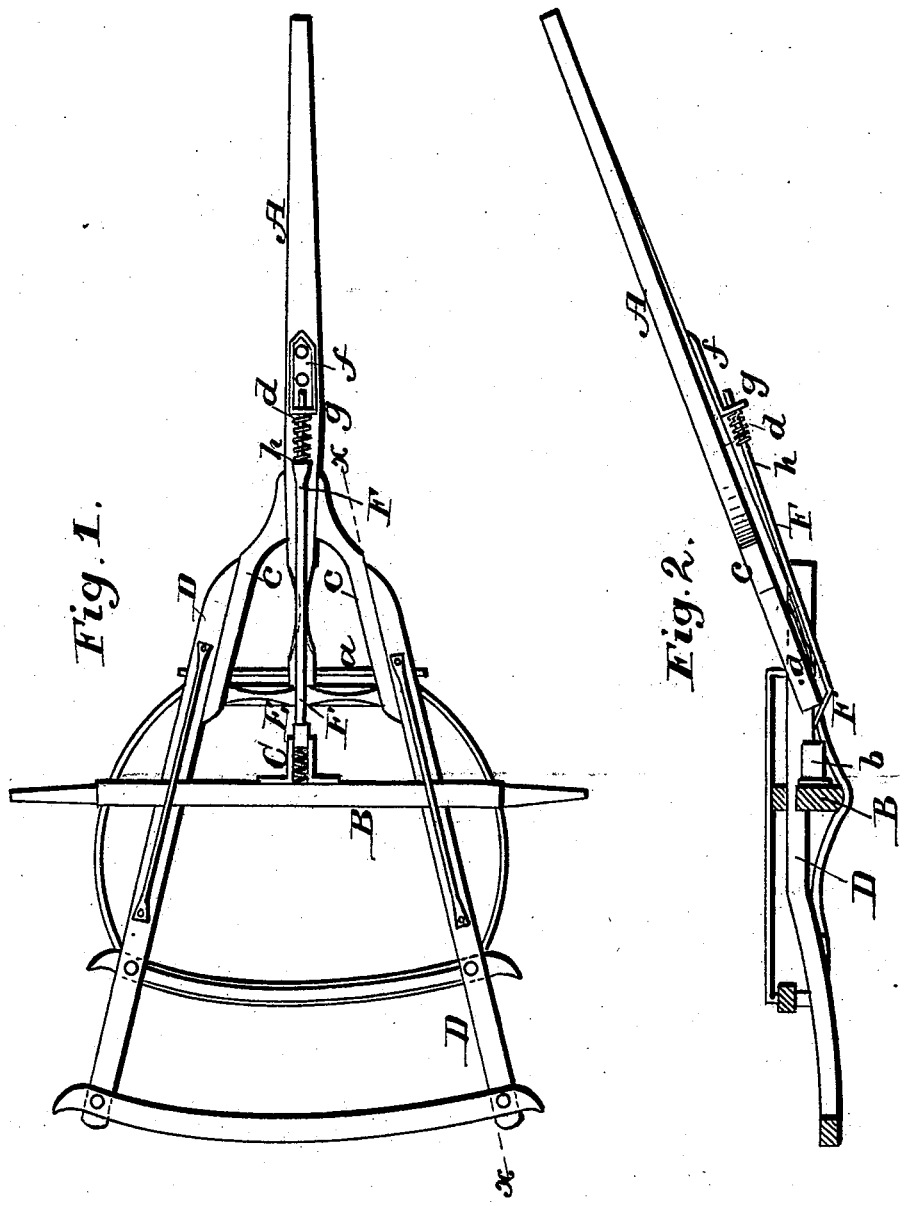

United States Patent Office.

HOSEA B. HURD, OF AURORA, ILLINOIS, ASSIGNOR TO HIMSELF, JOHN N. HURD, AND SAMUEL HURD, OF SAME PLACE.

Letters Patent No. 77,382, dated April 28, 1868.

IMPROVEMENT IN CARRIAGE-POLE SUPPORT.

The Schedule referred to in these Letters Patent and making part of the same.

TO ALL WHOM IT MAY CONCERN:

Be it known that I, HOSEA B. HURD, of Aurora, in the county of Kane, and State of Illinois, have invented a new and useful Carriage-Pole Supporter; and I do hereby declare and make known that the following is a full, clear, and exact description of the same, reference being had to the accompanying drawings, and the letters and figures marked thereon, which form part of this specification.

My invention consists in a novel device to be attached to the poles, shaft, or thills of carriages of all kinds, for the purpose of holding them up in the proper position, thereby relieving the necks of the horse or horses from the constant weight and wear of the pole or shaft, as hereinafter more fully set forth.

To enable those skilled in the art to understand how to make and use my said invention, I will proceed to describe the same with particularity, making reference in so doing to the aforesaid drawing, in which—

Figure 1 represents a view of the under side of the carriage-pole, having my invention thereto applied, and Figure 2 is a side view of my invention, in section, at the line $x$ in fig. 1.

Similar letters of reference in the different figures denote the same parts of my invention.

A represents the pole, to which are secured the two braces C C, the pole and braces being rigidly secured to a cross-piece, E, being constructed in the ordinary manner, and secured within the frame D, upon the axle-tree B, by means of the rod $a$, or in any other suitable manner, so that said pole may move up and down upon said rod $a$ as a pivot.

This is the ordinary mode of attaching a pole, and it is obvious that without some appliance to support the pole, its entire weight would come upon the necks of the horses, which objection it is the aim of my invention to obviate.

Upon the front of the axle-tree, at the point back of the end of the pole A, I secure, in any suitable manner, a tube or case, $b$, which is open in front, and contains a spiral spring, $c$, or any equivalent thereof.

This tube or case, instead of being secured in the manner shown, upon the front of the axle-tree, may be attached in any suitable manner upon the upper or lower side of the axle, provided its open end be towards the front of the vehicle.

The end of said tube is so constructed as to retain the spring within, and at the same time permit one end of the bar F, which is bent, substantially as shown, to enter said tube and rest against the spring contained therein, as before mentioned.

The said bar or arm, F, passes along under the pole, its end terminating in a rod of smaller size, forming a shoulder at $h$, the said smaller part passing through a lip, $g$, upon the plate $f$, which is secured to the pole rigidly, as shown.

There is also arranged around the rod F, between the shoulder $h$ and the stationary lip $g$, a coil spring, as shown, marked $d$.

By this arrangement, it is readily seen that the springs $c$ $d$ act in combination with the arm or bar F to sustain the pole in the desired position, while at the same time they permit the pole to be depressed when desired.

Said bar, if provided with a spring, $d$, as shown, need only to be hinged at its rear end, without the spring $c$, or the spring $c$ may be used alone, by having the arm F so constructed that the shoulder $h$ rests against the lip $g$; but I prefer to use both springs, substantially as described.

The device herein described for supporting the pole may be applied upon the upper side of the pole, if desired, or combined with the pole under any arrangement which will produce the same result or operation.

Having described the construction and operation of my invention, I will specify what I claim, and desire to secure by Letters Patent.

I claim the combination and arrangement of the tube $b$, spring $c$, bar F, spring $d$, shoulder $h$, and lip $g$, with the axle B and pole A, in the manner herein set forth.

HOSEA B. HURD.

Witnesses:
A. G. McDOLE,
N. M. SMITH.